United States Patent [19]

Patsy, Jr.

[11] Patent Number: 5,076,033
[45] Date of Patent: Dec. 31, 1991

[54] METHOD AND APPARATUS FOR CONNECTING FABRIC FRAME STRUCTURE ELEMENTS

[76] Inventor: Glorio J. Patsy, Jr., 3560 Strawberry La., Cumming, Ga. 30130

[21] Appl. No.: 530,331

[22] Filed: May 30, 1990

Related U.S. Application Data

[63] Continuation-in-part of Ser. No. 361,112, Apr. 3, 1990.

[51] Int. Cl.$^5$ .............................................. A47H 13/00
[52] U.S. Cl. .......................................... 52/222; 52/63; 160/392; 160/395
[58] Field of Search ........................... 52/222, 63, 741; 160/395, 392, 380

[56] References Cited

U.S. PATENT DOCUMENTS

| | | | | |
|---|---|---|---|---|
| 3,875,623 | 4/1975 | Johnston | | 160/395 |
| 3,987,835 | 10/1976 | Bloomfield | | 160/392 |
| 4,887,626 | 12/1989 | Dalo et al. | | 52/222 |
| 4,920,714 | 5/1990 | Sease | | 52/222 |

*Primary Examiner*—David A. Scherbel
*Assistant Examiner*—Joanne C. Downs
*Attorney, Agent, or Firm*—Richard C. Litman

[57] ABSTRACT

The present invention discloses various novel methods of conjoining parallel structural members of awning or other fabric framing structures, as well as an apparatus for accomplishing those methods. By properly orienting the structural members to be conjoined and securing them together with a properly formed clamp, the existing staple channel cover may also serve as a light and water tight seal between fabric covered sections of such structures. Various combinations of such structural members are disclosed, with methods described of conjoining those members and providing for sealing between such members.

6 Claims, 3 Drawing Sheets

METHOD AND APPARATUS FOR CONNECTING FABRIC FRAME STRUCTURE ELEMENTS

REFERENCE TO RELATED PATENT APPLICATION

This application is a Continuation-in-Part of Design patent application Ser. No. 07/361,112, allowed Apr. 3, 1990.

FIELD OF THE INVENTION

This invention relates generally to the field of awning and other fabric framing structures, and more specifically to improved methods and apparatus for the interconnection of various elements of such structures.

BACKGROUND OF THE INVENTION

Various systems and methods for fabricating awning structures and frames for fabric covered structures are known. Some of these methods use various shapes of extrusions for the frame structure, in combination with the stapling of the fabric covering material within a generally U-shaped channel in the extrusion and the covering of the staple channel with an extruded pliable component. This method results in a relatively light and water tight securing means for the fabric, so long as that fabric is in a continuous sheet and secured to a single extruded frame member.

A problem arises when a larger structure must be constructed and two or more sheets of fabric material or the like must be used to cover the entire structure, and/or two or more sections of extrusion must be joined. Again, several methods may be used, such as welding the various frame members together and sewing sections of fabric together. While these methods are reasonably durable, they do possess disadvantages for use in the field.

Most welding is done in the shop, since proper equipment is more accessible there. Since most fabric framing structures are aluminum, special electrical welding equipment (Heliarc, TIG—Tungsten Inert Gas—or the like) is generally used rather than more easily portable oxyacetylene equipment which is normally used for steel structures. Such portable electrical welding equipment is of course available, but is bulkier and less portable than oxyacetylene equipment. Obviously, for larger jobs it is necessary to perform such electrical welding operations in the field at the construction site rather than in the shop, necessitating the carriage of special electrical welding equipment to the job site and the provision of electrical power for the welding equipment.

While other mechanical connecting systems are known, problems exist in providing a light and water tight seal when two or more sections of fabric are conjoined at that point. In at least one other system, a specially shaped pliable covering extrusion must be used to seal the joint between two parallel structural members. This results in an unsightly seam, since the joint seal does not match the other extruded pliable channel covering used along other frame members.

Sewed seams present other problems. Unless the measurements are absolutely precise, it is unlikely that a seam will fall exactly within the staple channel of a framing extrusion. This will result in an unsightly seam which may admit water and light through the thread holes. In addition, the thread used may well deteriorate after being exposed to sunlight and weather for a period of time, resulting in the requirement for major repairs on the fabric covering.

Other techniques are used to eliminate the sewing requirement. Generally, any fabric used is cut so as to be joined within the staple channel of an extrusion and is merely stapled in place with the conjoining section of fabric. However, systems other than the present invention are generally sized so as to cause difficulty in inserting the nose of a staple gun or an extruded pliable channel covering when more than one layer of fabric is used.

The need arises for a system and method of joining two or more fabric framing structure members and two or more overlying fabric covering sheets, which will provide a joint or seam which is uniform in appearance with other joints or seams in other areas of the structure. The method should provide a joint or seam which is both light and water tight. The method should permit easy assembly in the field with relatively simple hand tools or battery powered portable electrical tools, thus eliminating the need for transporting relatively heavy and/or bulky specialized equipment to the job site and the need for a source of electrical power.

DESCRIPTION OF THE RELATED ART

Dunn U.S. Pat. No. 2,950,727 discloses a support apparatus for flexible awning covers comprising a relatively flat extrusion which contains a jaw at each edge. A continuous loop is formed in the edge of the fabric material and a rod of relatively hard material is inserted into this elongated loop, thus providing some thickness to the fabric edge. This assembly is then inserted into the jaw of the extrusion, which due to the relatively narrow mouth will thereby prevent the edge of the fabric from pulling out. This system does not provide for the conjoining of sections of fabric other than at the opposite edges of the flange, thereby leaving the open flange center exposed along with the fastening screws. Leakage is a definite possibility with such a system, and if the fabric is pulled taut the possibility exists that the extruded jaws will spread, thereby releasing the fabric edge.

Deddo U.S. Pat. No. 3,360,886 discloses a system using a plurality of specially shaped extrusions. This system requires a relatively large number of specialized shapes, and moreover is intended to function for relatively stiff sheet awning material rather than a flexible fabric material.

Reilly, Sr. U.S. Pat. No. 4,192,112 discloses a system of fabric retention for awnings similar to that of the Dunn patent cited above.

Gandy U.S. Pat. No. 4,692,847 discloses a lighted awning assembly in which connecting means for various frame members is disclosed. This connecting means, however, primarily comprises fittings which may be inserted into the hollow ends of the extruded frame members in a manner similar to tongue and groove construction. No means is disclosed for securing parallel lengths of material with conjoining fabric sections.

Markham U.S. Pat. No. 4,768,317 discloses a method for temporarily securing awning material to an awning frame. No means is disclosed, however, for securing the fabric material within an extruded channel, nor for joining parallel channels together.

In addition to the above cited patents, applicant is aware of similar framing systems currently in use in the industry. A method in wide use comprises the use of extruded channels, generally of aluminum, to which fabric covering material is stapled within a preformed channel of the extrusion. The channel is then covered with a pliable extrusion. However, the above described method makes no provision for the conjoining of parallel fabric covered frame members in order to produce a light and water tight seal between those members.

None of the above noted patents or references, either singly or in combination, are seen to disclose the specific arrangement of concepts disclosed by the present invention.

SUMMARY OF THE INVENTION

By the present invention, an improved method and apparatus for joining parallel sections of structural framing members together in the construction of fabric framing systems, such as awnings and the like, is provided.

Accordingly, one of the objects of the present invention is to provide an improved method and apparatus for joining parallel sections of such structural members which does not rely upon welding or fusion of materials, but uses a mechanical joining means.

Another of the objects of the present invention is to provide a method and apparatus for joining such structural members which may be easily performed by relatively unskilled labor in the field.

Yet another of the objects of the present invention is to provide a method and apparatus for joining such structural members which allows for the inclusion of the fabric covering material within the structural joint.

Still another of the objects of the present invention is to provide a method and apparatus for fabricating a fabric seam at such joints, which seam is both light and water tight.

A further object of the present invention is to provide a method and apparatus for joining such fabric framing structural members which may be accomplished using a relatively small number of differently shaped extruded components.

An additional object of the present invention is to provide a method and apparatus for joining parallel fabric framing structural members in which such members may be oriented in various directions relative to their parallel axes.

Another object of the present invention is to provide a method and apparatus for joining parallel fabric framing structural members which allows the subassemblies to be joined to be covered with fabric or other material prior to assembling those subassemblies.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
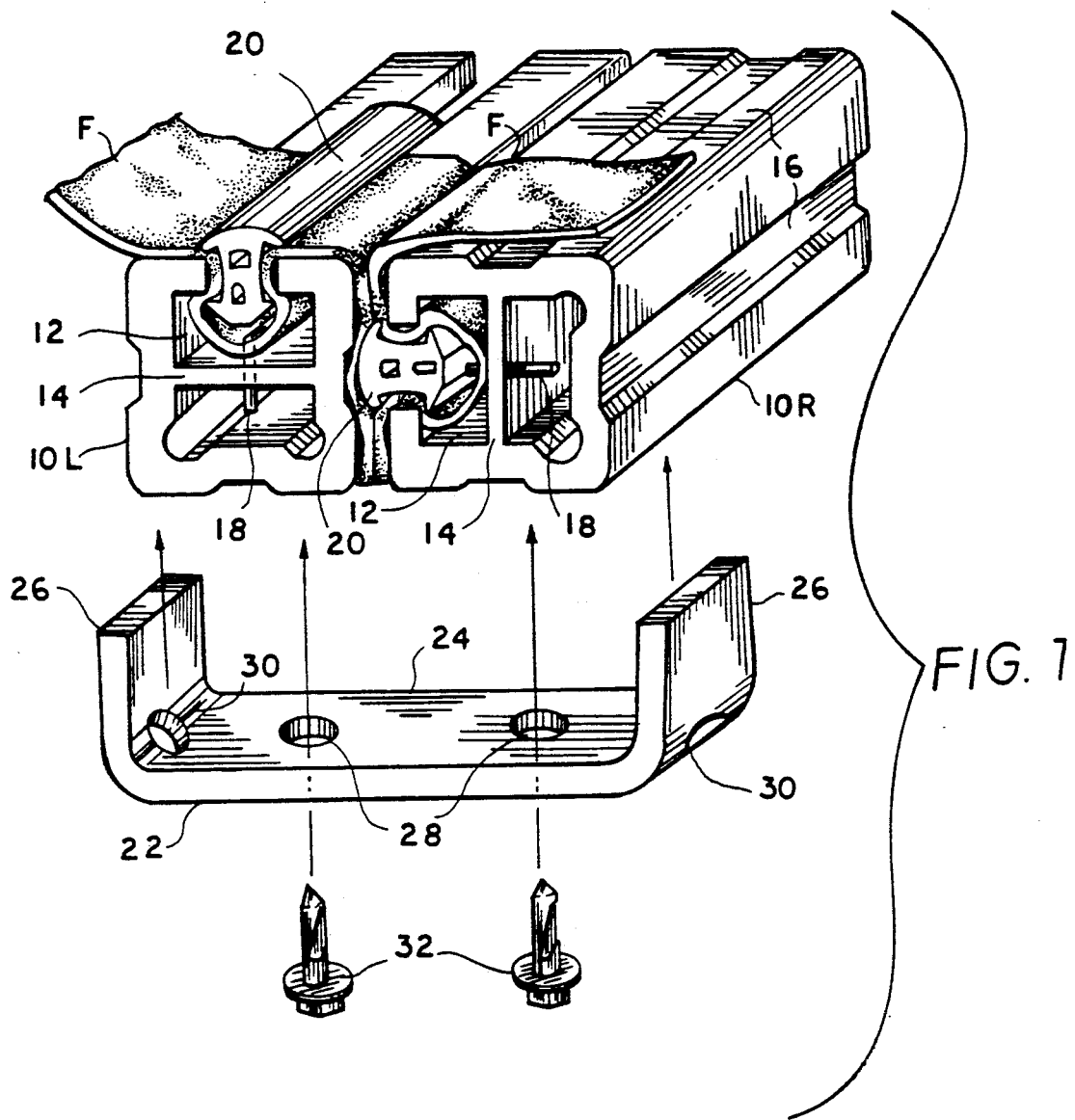
FIG. 1 is a partially exploded perspective view of the various components used in the present invention.
Figure 2:
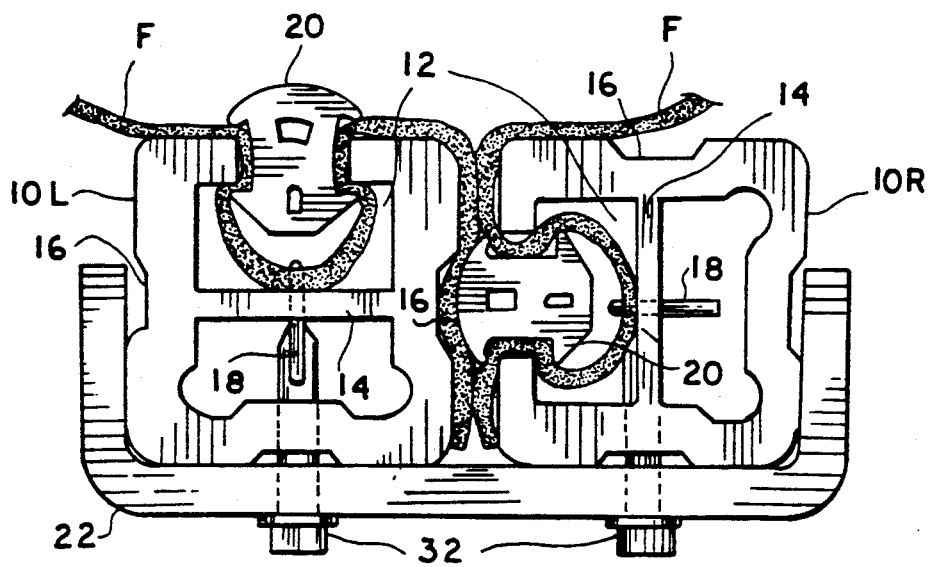
FIG. 2 is a cross sectional view of a completed assembly of the components of FIG. 1.
Figure 5:
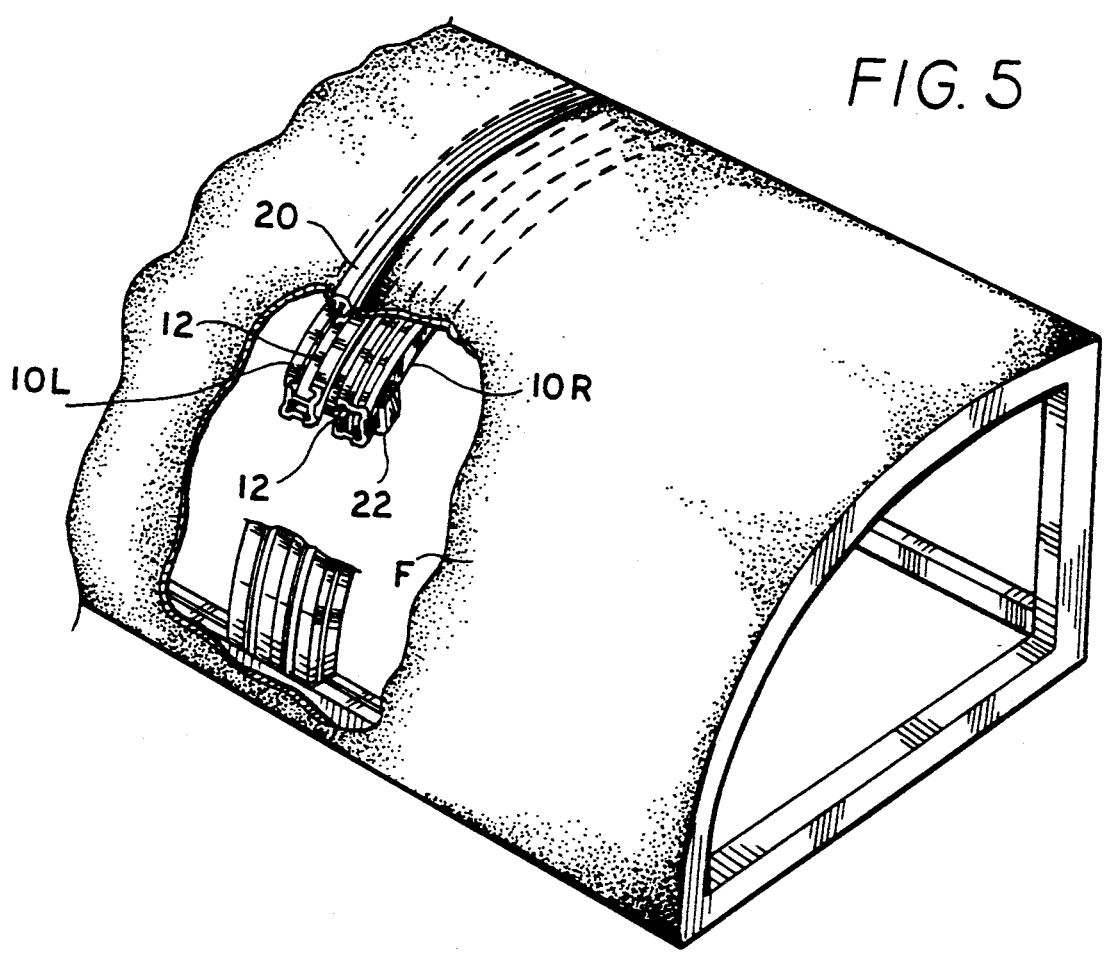
FIG. 5 is a perspective view, partially cut away, showing an awning and frame assembly constructed using the method of the present invention.

Referring now to the drawings, particularly FIGS. 1, 2 and 5, the present invention may be seen to disclose an awning or fabric framing system which provides for a mechanical method and apparatus for easy field assembly of conjoining frame members; and which results in a light and water tight structure FIG. 5 is a partially cutaway perspective of the assembly shown in end view in FIG. 2, and in exploded view in FIG. 1. These assemblies are formed primarily of two extruded lengths of material 10L and 10R, representing respectively the left and right extruded components shown in the various figures. Extrusions 10L and 10R are preferably formed of an aluminum alloy, but may be formed from any suitable metallic or non metallic material. Extrusions 10L and 10R are identical, but are provided with separate designations in order to differentiate between their respective positions and orientations as shown in the drawings. Extrusions 10L and 10R each contain a continuous channel 12 formed in one side. A staple platform 14 is formed within the interior of each extrusion 10L and 10R. The remaining three sides of extrusions 10L and 10R which do not contain a channel 12, are formed with continuous depressions 16 which run parallel to the length of the extrusion 10L or 10R.

It is often necessary to construct an awning or other fabric frame from two or more subassemblies, and to then join those subassemblies at the job site to form the completed structure. By using the method of the present invention, these subassemblies may be completed at the shop, if so desired, even to the extent of completing the installation of the fabric or other covering. After the basic structure of the subassembly is completed, fabric or other pliable material F may be installed by inserting a fold of such material F within the channel 12 of extrusion 10 and stapling the material F in place with a staple gun providing sufficient force to drive a staple 18 through staple platform 14, thus securing material F within channel 12 and therefore to extrusion 10L or 10R. A protective and decorative insert 20 is then installed within the opening of channel 12, providing weather protection for the staples 18 and channel 12 as well as providing an attractive trim for the completed installation. Insert 20 is also an extrusion, and is preferably formed of a flexible plastic material such as polyvinyl chloride (PVC) but may be formed of any other suitable material as desired.

The above description of fabric installation is generally well known, and as noted may be accomplished either in the shop or in the field at the job site. However, prior to the present invention no suitable method existed for the assembly of subassemblies which were already fabric covered. In order to join the covered subassemblies together, a generally U shaped clamp 22 is provided. Clamp 22 is formed of aluminum or other suitable material and contains a flat center portion 24 which is bounded by two upwardly extending end elements 26 at each end. Center portion 24 is of sufficient length so as to allow end elements 26 to fit closely around two extrusions 10L and 10R which are parallel and conjoining one another, as would occur when two otherwise completed subassemblies are to be joined. Clamp 22 is also provided with holes 28 in center portion 24 which are spaced so as to be located directly on the centerlines of any extrusions 10L and 10R upon which clamp 22 may be installed. Additional holes 30 are provided at the junction of center portion 24 and end elements 26.

Awning or other fabric frame subassemblies may be easily assembled at the job site using the above described components by fitting two cooperating subassemblies closely together and installing a plurality of clamps 22 along the conjoined lengths of extrusions 10L and 10R of such subassemblies, as shown in FIG. 5. Clamps 22 may then be secured to extrusions 10L and 10R by drilling holes into the extrusions 10L and 10R through the holes 28 and/or 30 provided in clamp 22 and installing screws 32 or other suitable fasteners. As shown in FIG. 5, the conjoining extrusions 10L and 10R may be bent to form an arc or may be left in their straight condition as shown in FIG. 1. Other shapes, not shown, may also be formed so long as the two extrusions 10L and 10R may conjoin and cooperate with one another along their entire lengths.

When any subassemblies are constructed, care must be taken to ensure that the proper orientation of extrusions 10L and 10R is maintained. As shown in FIGS. 1, 2 and 5, the fabric channel 12 of extrusion 10L is oriented upward, while the fabric channel 12 of extrusion 10R is oriented so as to face extrusion 10L. Thus, any bends which are to be made in extrusions 10L and 10R must be planned for by feeding the extrusions 10L and 10R through the bending device in the proper orientation.

As noted above, clamp 22 is formed so as to tightly fit around two conjoined extrusions 10L and 10R. When material F is installed within a channel 12 of extrusion 10R and channel cover 20 is placed over the channel 12 as shown in FIGS. 1, 2 and 5, some interference will result between the two extrusions 10L and 10R due to the raised channel cover 20 being positioned between the two extrusions 10L and 10R. As clamp 22 is forced over extrusions 10L and 10R, channel cover 20 will be pushed tightly into the cooperating depression 16 of the conjoining extrusion 10L, thus forming a light and water tight joint between the two.

Channel cover 20 and material F contained therein will tend to cause extrusions 10L and 10R, and thus end portions 26 of clamp 22, to spread apart. When screws 32 are installed, they will tend to pull extrusions 10L and 10R into close contact with central portion 24 of clamp 22, and thus cause the depression 16 facing channel cover 20 to be forced even more closely together, providing an even tighter seal.

Figure 3:
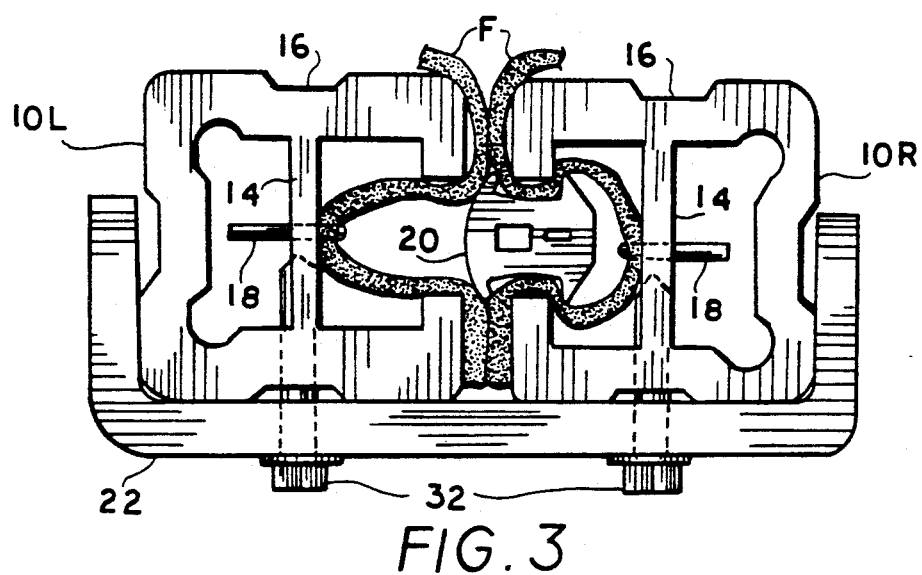
FIG. 3 is a cross sectional view of an alternate orientation of the assembled extruded structural members shown in FIGS. 1 and 2.
Figure 4:
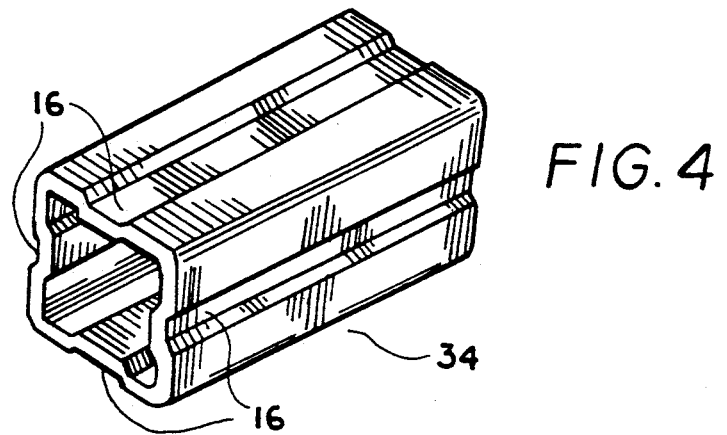
FIG. 4 is a perspective view of an alternate extrusion shape which may be used where no fabric attachment is required.

More than a single sheet of material F may be installed within a single channel 12 of an extrusion 10L or 10R. If this is the case, an alternate extrusion 34 of FIG. 4 may be used in lieu of an extrusion 10L or 10R. Extrusion 34 is formed with depressions 16 on each face, thus providing for a cooperating fit with any channel cover 20 which may be installed upon a conjoining extrusion 10L or 10R Such an assembly will provide for the concealment of any channel cover 20 used at such an assembly, thus providing for a cleaner external appearance. Alternatively, if material F is installed within channels 12 of two conjoining extrusions 10L and 10R as shown in FIG. 3, one channel cover 20 may be omitted from the assembly and the extrusions 10L and 10R conjoined with their two openings for channels 12 facing one another. The same procedure is followed for the installation of clamps 22 upon such an assembly as is followed for other combinations using extrusion 34 or the construction shown in FIGS. 1, 2 and 5.

It is to be understood that the present invention is not limited to the sole embodiment described above, but encompasses any and all embodiments within the scope of the following claims.

I claim:

1. A method of conjoining parallel structural members of awnings or other framing structures for pliable sheet material, each of said structural members having a plurality of faces and including a longitudinal channel for the installation of said pliable sheet material therein, an internal platform for the securing of said pliable sheet material thereto, and longitudinal depressions within the remaining faces, the method comprising:
    orienting the first of said structural members so that said longitudinal channel faces an outer periphery of said framing structure;
    orienting the second of said structural members so that said longitudinal channel faces said first structural member;
    bending said structural members as required;
    securing said pliable sheet material to said internal platforms within said longitudinal channels;
    covering said longitudinal channels with cooperating channel covers;
    installing a plurality of closely fitting clamps,
    each of said clamps having a central portion,
    said central portion defined by end elements extending at right angles to said central portion and thus essentially comprising a U shape,
    said end elements spaced apart so as to provide closely fitting retention for said parallel structural members,
    said central portion containing a plurality of holes spaced so as to be positioned along the longitudinal centerlines of said structural members and a plurality of holes located at the junctions of said central portion and said end elements;
    forming cooperating holes in said structural members; and
    installing fasteners through said holes in said clamps and said cooperating holes in said structural members, thus urging said channel cover of said second structural member and one face of said first structural member closely together and forming a joint impervious to light and liquid penetration.

2. A method of conjoining parallel structural members of awnings or other framing structures for pliable sheet material, each of said structural members having a plurality of faces and including a longitudinal channel for the installation of said pliable sheet material therein, an internal platform for the securing of said pliable sheet material thereto, and longitudinal depressions within the remaining faces, the method comprising:
    orienting the first of said structural members so that said longitudinal channel faces the second of said structural members;
    orienting the second of said structural members so that said longitudinal channel faces said first structural member;
    bending said structural members as required;
    securing said pliable sheet material to said internal platforms within said longitudinal channels;
    covering one of said longitudinal channels with cooperating channel covers;

installing a plurality of closely fitting clamps,
each of said clamps having a central portion,
said central portion defined by end elements extending at right angles to said central portion and thus essentially comprising a U shape,
said end elements spaced apart so as to provide closely fitting retention for said parallel structural members,
said central portion containing a plurality of holes spaced so as to be positioned along the longitudinal centerlines of said structural members and a plurality of holes located at the junctions of said central portion and said end elements;
forming cooperating holes in said structural members; and
installing fasteners through said holes in said clamps and said cooperating holes in said structural members, thus urging said channel cover of one of said structural members and said channel of the other of said structural members closely together and forming a joint impervious to light and liquid penetration.

3. A fabric framing structure assembly constructed according to the method of claim 2, comprising;
said first structural member, said second structural member, said pliable sheet material, one of said channel covers, said clamps, and said fasteners,
said longitudinal channel of said first structural member facing said second structural member,
said longitudinal channel of said second structural member facing said first structural member,
said pliable sheet material installed within said longitudinal channels of said first and said second structural members,
one of said channel covers installed within one of said channels of said structural members, and
said clamps installed by means of said fasteners so as to urge said first and said second structural members closely together.

4. A fabric framing structure assembly constructed according to the method of claim 1, comprising;
said first structural member, said second structural member, said pliable sheet material, said channel covers, said clamps, and said fasteners,
said longitudinal channel of said first structural member facing said outer periphery of said framing structure,
said longitudinal channel of said second structural member facing said first structural member,
said pliable sheet material installed within said longitudinal channels of said first and said second structural members,
said channel covers installed within said channels of said first and said second structural members, and
said clamps installed by means of said fasteners so as to urge said first and said second structural members closely together.

5. A method of conjoining parallel structural members of awnings or other framing structures for pliable sheet material, one of said structural members having a plurality of faces and including a longitudinal channel for the installation of said pliable sheet material therein, an internal platform for the securing of said pliable sheet material thereto, and longitudinal depressions within the remaining faces, the second of said structural members having a plurality of faces with each of said faces containing a longitudinal depression therein, the method comprising:
orienting the first of said structural members so that said longitudinal channel faces said second structural member;
bending said structural members as required;
securing said pliable sheet material to said internal platform within said longitudinal channel of said first structural member;
covering said longitudinal channel with a cooperating channel cover;
installing a plurality of said clamps;
forming cooperating holes in said structural members; and
installing fasteners through said holes in said clamps and said cooperating holes in said structural members, thus urging said channel cover of said first structural member and one face of said second structural member closely together and forming a joint impervious to light and liquid penetration.

6. A fabric framing structure assembly constructed according to the method of claim 5, comprising;
said first structural member, said second structural member, said pliable sheet material, one of said channel covers, said clamps, and said fasteners,
said longitudinal channel of said first structural member facing said second structural member,
said pliable sheet material installed within said longitudinal channels of said first and said second structural members,
said channel covers installed within said channels of said first and said second structural members, and
said clamps installed by means of said fasteners so as to urge said first and said second structural members closely together.

* * * * *